No. 838,988. PATENTED DEC. 18, 1906.
O. R. HARRIS.
VALVE GEAR FOR ENGINES.
APPLICATION FILED FEB. 19, 1906.

3 SHEETS—SHEET 1.

WITNESSES: Otis R. Harris INVENTOR
By
ATTORNEYS

No. 838,988. PATENTED DEC. 18, 1906.
O. R. HARRIS.
VALVE GEAR FOR ENGINES.
APPLICATION FILED FEB. 19, 1906.

3 SHEETS—SHEET 3.

WITNESSES:
E. W. Stewart
Jno. E. Parker

Otis R. Harris INVENTOR
By C. A. Snow & Co.
ATTORNEYS

UNITED STATES PATENT OFFICE.

OTIS ROBERT HARRIS, OF GLOBE, ARIZONA TERRITORY.

VALVE-GEAR FOR ENGINES.

No. 838,988.      Specification of Letters Patent.      Patented Dec. 18, 1906.

Application filed February 19, 1906. Serial No. 301,881.

*To all whom it may concern:*

Be it known that I, OTIS ROBERT HARRIS, a citizen of the United States, residing at Globe, in the county of Gila and Territory of Arizona, have invented a new and useful Valve-Gear for Engines, of which the following is a specification.

This invention relates to steam-engines, and while many of its features are of value in connection with stationary, marine, and other engines it is intended principally for use in connection with locomotive-engines.

One of the principal objects of the invention is to secure a construction which will permit the attainment of great speed and power and in which the piston is arranged to oscillate within an arcuate chamber or cylinder as distinguished from the usual circular piston slidable within a tubular cylinder.

A further object of the invention is to provide an improved valve-gear in which eccentrics are dispensed with, the link being arranged to operate through a system of levers.

With these and other objects in view, as will more fully hereinafter appear, the invention consists in certain novel features of construction and arrangement of parts hereinafter fully described, illustrated in the accompanying drawings, and particularly pointed out in the appended claim, it being understood that various changes in the form, proportions, size, and minor details of the structure may be made without departing from the spirit or sacrificing any of the advantages of the invention.

Figure 1:
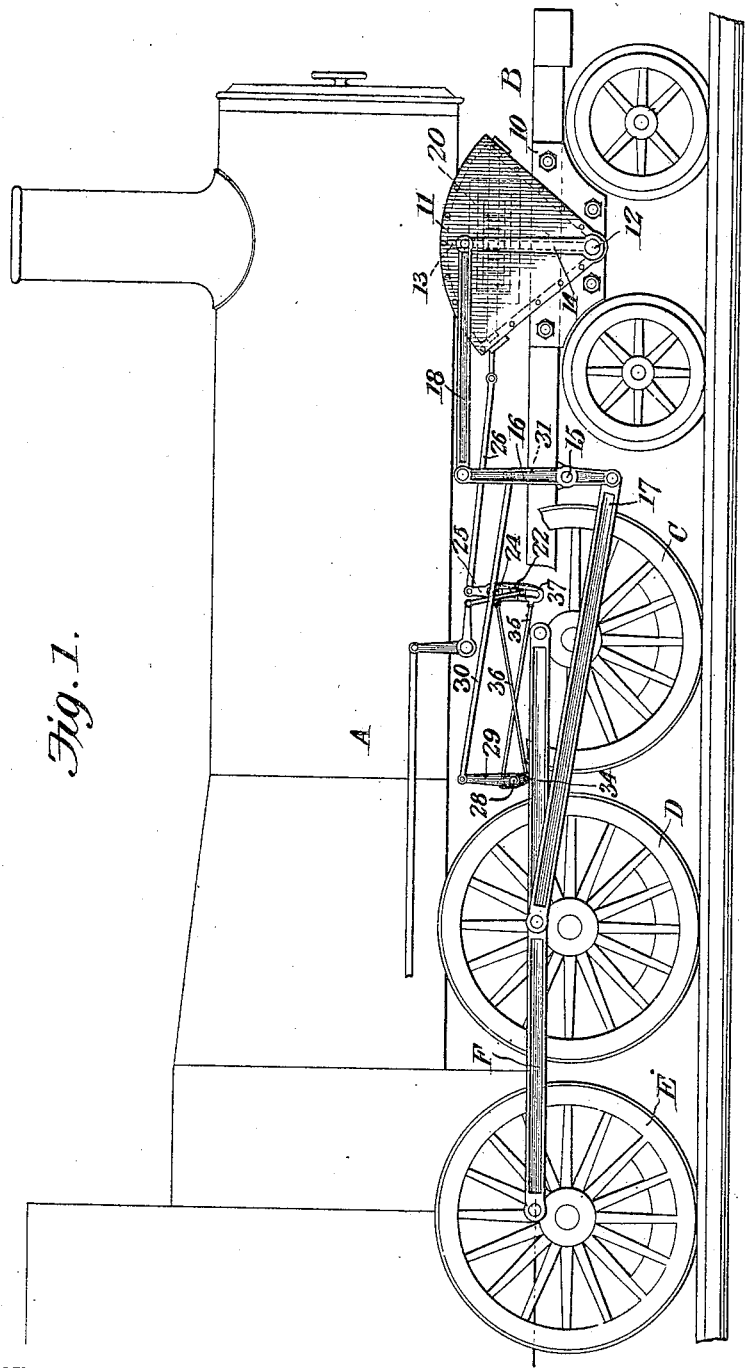
Figure 2:
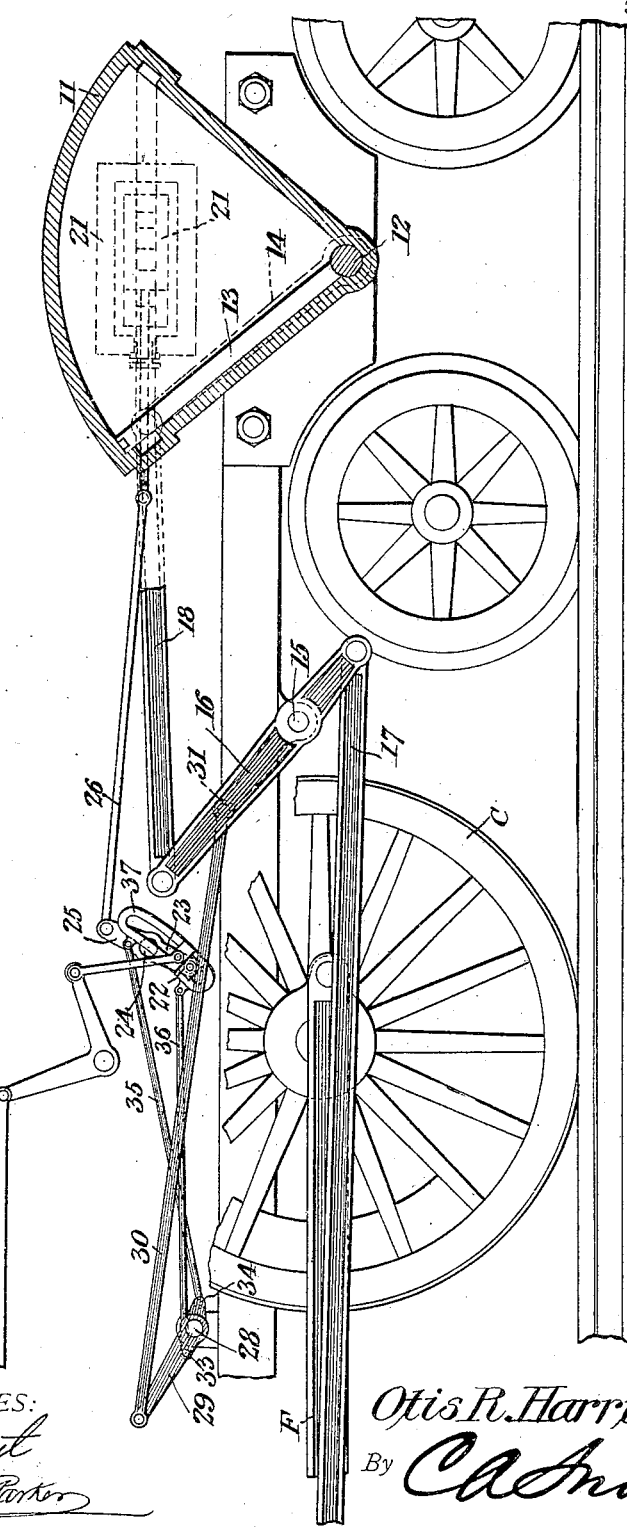
Figure 3:
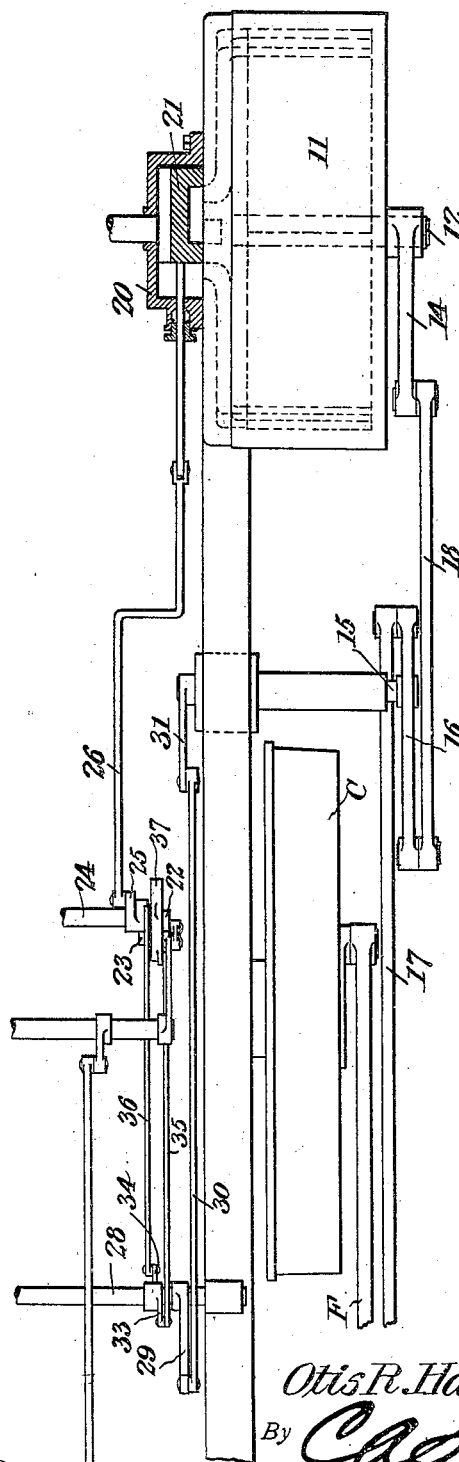

In the accompanying drawings, Figure 1 a side elevation of an engine constructed in accordance with the invention. Fig. 2 is a similar view of a portion of the valve-gear, showing the cylinder in section. Fig. 3 is a plan view showing the steam-chest in section.

Similar characters of reference are employed to indicate corresponding parts throughout the several figures of the drawings.

The locomotive includes the boiler A, the front truck B, and in the present instance three sets of drivers C, D, and E, the crank-pins of the latter being connected by side rods F in the usual manner.

The saddle 10 at each side of the engine is arranged for the reception of an arcuate cylinder 11, at the lowest portion of which is journaled a shaft 12, extending out through a suitable stuffing-box at the side of the cylinder. Arranged within the cylinder is an oscillatory piston 13, that is rigidly secured to the shaft 12 and moves with the latter as an axis from one side of the cylinder to the other.

To the outer end of the shaft 12 is secured a rocker-arm 14, which is maintained in parallelism with the piston and receives motion therefrom through said shaft 12.

At a suitable point on the frame, preferably slightly in advance of the forward driver, is a horizontally-disposed shaft 15, to which is secured a lever 16, the lower arm of the lever being connected by a main rod 17 to the crank-pin of the center driver D for the purpose of imparting movement to the center crank-pin and from thence through the side rods to the crank-pins of the front and rear drivers. The upper end of the lever 16 is connected by a rod 18 to the upper end of an arm 14, so that as the piston oscillates the lever 16 will be moved and the drivers will be actuated.

Secured to the inner wall of the cylinder 11 is a steam-chest 20, within which is arranged a slide-valve 21, the valve working on a seat from which ports extend to the opposite ends of the cylinder and the exhaust, the valve and the ports being arranged in the usual manner.

The valve receives motion from a link-block 22, that is carried by a rocker-arm 23 on a shaft 24, said shaft being provided with a second rocker-arm 25, which is connected by a rod 26 to the valve.

The frame is provided with bearings for the reception of a rock-shaft 28, to the outer end of which is secured an arm 29, that is connected by a rod 30 to an arm 31, that is carried by the shaft 15. The shaft 28 is provided with two diametrically-opposed arms 33 and 34, and these are connected by crossed links 35 and 36, respectively, to a link 37, the latter being provided with the usual supporting and adjusting mechanism and serving to transmit movement to the link-block 22 and from thence to the valve. In the operation of this portion of the mechanism the shaft 15 is rocked through its connection with the piston, and this movement is transmitted through the rod 30 to the arm 29 in order to effect a corresponding movement of the shaft 28. As the shaft is rocked the two arms 33 and 34 will be moved, and the link will be operated through the connecting-rods 35 and 36 at a speed proportioned to the speed of travel of the main piston.

I claim—

The combination with a cylinder, piston and valve, of a main lever fulcrumed on a fixed support at a point intermediate its ends, one end of said lever being connected to the piston and the other end to a power-transmitting mechanism, a rock-shaft, a rocker-arm thereon, a second rocker-arm receiving movement from the lever, a rod connecting the two rocker-arms, a two-armed lever carried by the rock-shaft and receiving motion therefrom, a link, crossed rods connecting the opposite ends of the link to the two arms of the rock-shaft, a link-block, and means for connecting the link-block to the valve.

In testimony that I claim the foregoing as my own I have hereto affixed my signature in the presence of two witnesses.

OTIS ROBERT HARRIS.

Witnesses:
J. R. FINLETTER,
M. F. FINLETTER.